(12) United States Patent
Palin et al.

(10) Patent No.: US 9,294,903 B2
(45) Date of Patent: Mar. 22, 2016

(54) METHOD AND APPARATUS FOR FACILITATING HANDOVER UTILIZING A PREDEFINED ATTRIBUTE PROTOCOL

(71) Applicant: Nokia Technologies Oy, Espoo (FI)

(72) Inventors: Arto Tapio Palin, Viiala (FI); Jukka Pekka Reunamaki, Tampere (FI)

(73) Assignee: Nokia Technologies Oy, Espoo (FI)

( * ) Notice: Subject to any disclaimer, the term of this patent is extended or adjusted under 35 U.S.C. 154(b) by 61 days.

(21) Appl. No.: 13/856,584

(22) Filed: Apr. 4, 2013

(65) Prior Publication Data

US 2014/0302849 A1 Oct. 9, 2014

(51) Int. Cl.
*H04W 36/00* (2009.01)
*H04W 8/00* (2009.01)
*H04W 36/14* (2009.01)

(52) U.S. Cl.
CPC .............. *H04W 8/005* (2013.01); *H04W 36/14* (2013.01)

(58) Field of Classification Search
USPC ......... 455/411, 41.1, 41.2, 556.1, 557, 92, 95
See application file for complete search history.

(56) References Cited

U.S. PATENT DOCUMENTS

| | | | | |
|---|---|---|---|---|
| 8,818,276 B2* | 8/2014 | Kiukkonen | ........... | H04L 63/107 455/41.1 |
| 9,008,917 B2* | 4/2015 | Gautama | ............... | B60W 10/30 455/41.2 |
| 2002/0167965 A1* | 11/2002 | Beasley | ............ | H04L 29/12009 370/465 |
| 2006/0046736 A1* | 3/2006 | Pering et al. | ................ | 455/452.2 |
| 2010/0009632 A1* | 1/2010 | Ibrahim et al. | ............... | 455/41.2 |
| 2011/0019640 A1* | 1/2011 | Chang et al. | .................. | 370/331 |
| 2012/0238216 A1* | 9/2012 | Hallowell | ............. | H04W 84/18 455/41.3 |
| 2013/0072116 A1* | 3/2013 | Song et al. | ................... | 455/41.1 |
| 2013/0346494 A1* | 12/2013 | Nakfour | .............. | H04L 67/1095 709/204 |
| 2014/0065967 A1* | 3/2014 | Shen | ............................ | 455/41.2 |
| 2014/0086125 A1* | 3/2014 | Polo | ................. | H04W 52/0229 370/311 |
| 2014/0141714 A1* | 5/2014 | Ghosh | ..................... | H04L 29/08 455/39 |
| 2014/0155033 A1* | 6/2014 | Lazaridus et al. | ............ | 455/411 |
| 2014/0188348 A1* | 7/2014 | Gautama | ............... | B60W 10/30 701/48 |
| 2014/0220883 A1* | 8/2014 | Emigh | ................... | H04H 20/61 455/3.01 |
| 2014/0315491 A1* | 10/2014 | Preiszler et al. | ............. | 455/41.2 |
| 2014/0372097 A1* | 12/2014 | Karvonen | ............ | A61B 5/0024 703/13 |

OTHER PUBLICATIONS

Specification: Adopted Documents [online][retrieved Feb. 1, 2013] Retrieved from the Internet: <URL: https://www.bluetooth.org/Technical/Specification/adopted.htm>.

* cited by examiner

*Primary Examiner* — Dai A Phuong
(74) *Attorney, Agent, or Firm* — Alston & Bird LLP (57) ABSTRACT

A method, apparatus and computer program product are provided to permit device discovery to be conducted utilizing a first radio technology, such as Bluetooth Low Energy (LE) technology, and to then handover to a second radio technology, e.g., a second radio technology having a greater bandwidth than the first radio technology. In the context of a method, device discovery is conducted utilizing a first radio technology. The method also causes communication of handover information in accordance with a predefined attribute protocol of the first radio technology. The method also performs handover to a second radio technology, such as Bluetooth technology or a wireless local area network technology, in accordance with the handover information communicated utilizing the first radio technology.

15 Claims, 6 Drawing Sheets

METHOD AND APPARATUS FOR FACILITATING HANDOVER UTILIZING A PREDEFINED ATTRIBUTE PROTOCOL

TECHNOLOGICAL FIELD

An example embodiment relates generally to wireless communications and, more particularly, to a method, apparatus and computer program product for facilitating a handover from a first radio technology to a second radio technology following device discovery utilizing the first radio technology.

BACKGROUND

Bluetooth Low Energy (LE) technology offers desirable privacy features and may be utilized for low power communication, such as for low power device discovery. In this regard, Bluetooth LE technology permits communication devices that are proximate one another to communicate in an energy efficient manner. However, Bluetooth LE communication has a lower peak gross data rate than a number of other radio technologies, such as Bluetooth basic rate (BR)/enhanced data rate (EDR) technology and wireless local area network (WLAN) technology. For example, the peak gross data rate for Bluetooth LE technology is a few hundred kilobits per second. This limitation upon the peak gross data rate supported by Bluetooth LE technology may undesirably limit the use of Bluetooth LE technology in conjunction with applications that may require higher bandwidth communication. Additionally, some applications may not be supported by Bluetooth LE communication. For example, there is currently no internet protocol (IP) defined for Bluetooth LE communication. Also, some applications may require Bluetooth BR/EDR profiles, which cannot be used over Bluetooth LE communication. Also, for applications that benefit from or require very low latency requirements, Bluetooth BR/EDR communication is generally better than Bluetooth LE communication.

However, handover from Bluetooth LE communication to another radio technology having a greater bandwidth has not been specified. Indeed, the Bluetooth core specification version 4.0 does not permit Bluetooth LE technology to the utilized in an instance in which Bluetooth BR or EDR connectivity is available. In this regard, in an instance in which a communications device that is capable of supporting Bluetooth BR, EDR and LE communications discovers another communications device that is capable of supporting Bluetooth BR, EDR and LE communications, the link that is established shall support either BR or EDR connectivity and not Bluetooth LE connectivity. As such, the advantages provided by Bluetooth LE technology, such an energy conservation and privacy features, may not be utilized as widely as may be desired.

BRIEF SUMMARY

A method, apparatus and computer program product are provided in accordance with an example embodiment to permit device discovery to be conducted utilizing a first radio technology, such as Bluetooth LE technology, and to then handover to a second radio technology, such as a second radio technology having a greater bandwidth than the first radio technology. As such, higher bandwidth communications may be supported by the second radio technology, such as Bluetooth BR/EDR technology or WLAN technology, while leveraging the first radio technology having a smaller bandwidth, such as Bluetooth LE technology, to conduct device discovery in an energy efficient manner. As such, the method, apparatus and computer program product of an example embodiment may take advantage of the desirable features offered by both the first and second radio technologies, while limiting the deleterious impact otherwise occasioned by restrictions imposed by the first and second radio technologies.

In one embodiment, a method is provided that includes conducting, at an apparatus, device discovery utilizing a first radio technology, such as Bluetooth Low Energy technology to discover at least one wireless device. In this regard, the method causes communication, by the apparatus, of handover information in accordance with a predefined attribute protocol of the first radio technology with the at least one discovered wireless device. The method of this embodiment also performs handover to a second radio technology, such as Bluetooth technology or a wireless local area network technology, for communicating with the at least one discovered wireless device over the second radio technology in accordance with the handover information communicated utilizing the first radio technology.

The predefined attribute protocol of the first radio technology may include one or more attributes for facilitating handover to the second radio technology. The one or more attributes may include an attribute indicating a capability to handover to the second radio technology. The one or more attributes may include an attribute indicating a request to handover to the second radio technology. The method may perform handover to the second radio technology by at least one of causing page signals to be transmitted based upon the handover information that was communicated or by receiving page signals based upon the handover information that was communicated.

In another embodiment, an apparatus is provided that includes at least one processor and at least one memory including computer program code with the at least one memory and the computer program code configured to, with the processor, cause the apparatus to conduct device discovery utilizing a first radio technology, such as Bluetooth Low Energy technology, to discover at least one wireless device. In this regard, the at least one memory and the computer program code are also configured to, with the processor, cause the apparatus to cause communication of handover information in accordance with a predefined attribute protocol of the first radio technology with the at least one discovered wireless device. The at least one memory and the computer program code may also be configured to, with the processor, cause the apparatus to perform handover to a second radio technology, such as Bluetooth technology or wireless local area network technology, for communicating with the at least one discovered wireless device over the second radio technology in accordance with the handover information communicated utilizing the first radio technology.

The predefined attribute protocol of the first radio technology may include one or more attributes for facilitating handover to the second radio technology. The one or more attributes may include an attribute indicating a capability to handover to the second radio technology. The one or more attributes may include an attribute indicating a request to handover to the second radio technology. The at least one memory and the computer program code may be configured to, with the processor, cause the apparatus of another embodiment to perform handover to the second radio technology by at least one of causing page signals to be transmitted based upon the handover information that was communicated or by receiving page signals based upon the handover information that was communicated.

In yet another embodiment, a computer program product is provided that includes at least one non-transitory computer-readable storage medium having computer-executable program code portions stored therein with the computer-executable program code portions including program code instructions for conducting device discovery utilizing a first radio technology, such as Bluetooth Low Energy technology, to discover at least one wireless device. In this regard, the computer-executable program code portions include program code instructions for causing communication of handover information in accordance with a predefined attribute protocol of the first radio technology with the at least one discovered wireless device. The computer-executable program code portions of this embodiment also include program code instructions for performing handover to a second radio technology, such as Bluetooth technology or wireless local area network technology, for communicating with the at least one discovered wireless device over the second radio technology in accordance with the handover information communicated utilizing the first radio technology.

The predefined attribute protocol of the first radio technology may include one or more attributes for facilitating handover to the second radio technology. The one or more attributes may include an attribute indicating a capability to handover to the second radio technology. The one or more attributes may include an attribute indicating a request to handover to the second radio technology. The program code instructions for performing handover to the second radio technology in accordance with another embodiment may include program code instructions for at least one of causing page signals to be transmitted based upon the handover information that was communicated or receiving page signals based upon the handover information that was communicated.

In a further embodiment, an apparatus is provided that includes means for conducting device discovery utilizing a first radio technology to discover at least one wireless device. In this regard, the apparatus also includes means for causing communication of handover information in accordance with a predefined attribute protocol of the first radio technology with the at least one discovered wireless device. The apparatus of this embodiment also includes means for performing handover to a second radio technology for communicating with the at least one discovered wireless device over the second radio technology in accordance with the handover information communicated utilizing the first radio technology.

BRIEF DESCRIPTION OF THE DRAWINGS

Having thus described certain example embodiments of the present disclosure in general terms, reference will hereinafter be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

Figure 1:
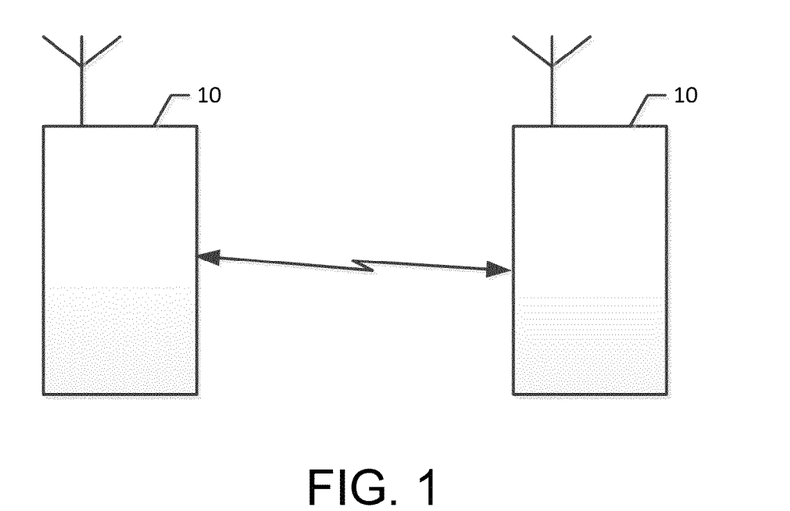
FIG. 1 is a schematic representation of a pair of communication devices that are configured to discover and then communicate with one another in accordance with an example embodiment of the present invention.

Referring to FIG. 1, a pair of communication devices 10 are illustrated. The communication devices may be embodied in a variety of different manners including as a mobile terminal, such as a portable digital assistant (PDA), mobile telephone, smartphone, pager, mobile television, gaming device, laptop computer, camera, tablet computer, headset, touch surface, video recorder, audio/video player, radio, electronic book, positioning device (e.g., global positioning system (GPS) device), or any combination of the aforementioned, and other types of voice and text communications systems. Alternatively, one or both of the communication devices may be embodied by a fixed computing device, such as a personal computer, a workstation or the like.

The communication devices 10 are proximate one another and, as such, are configured to communicate directly with one another via a wireless connection. As described below, the wireless connection between the communication devices may be established and maintained by the combination of first and second radio technologies. For example, device discovery may initially be conducted utilizing a first radio technology and communications between the communication devices may then be handed over to a second radio technology in order to support a greater bandwidth of communications therebetween.

Figure 2:
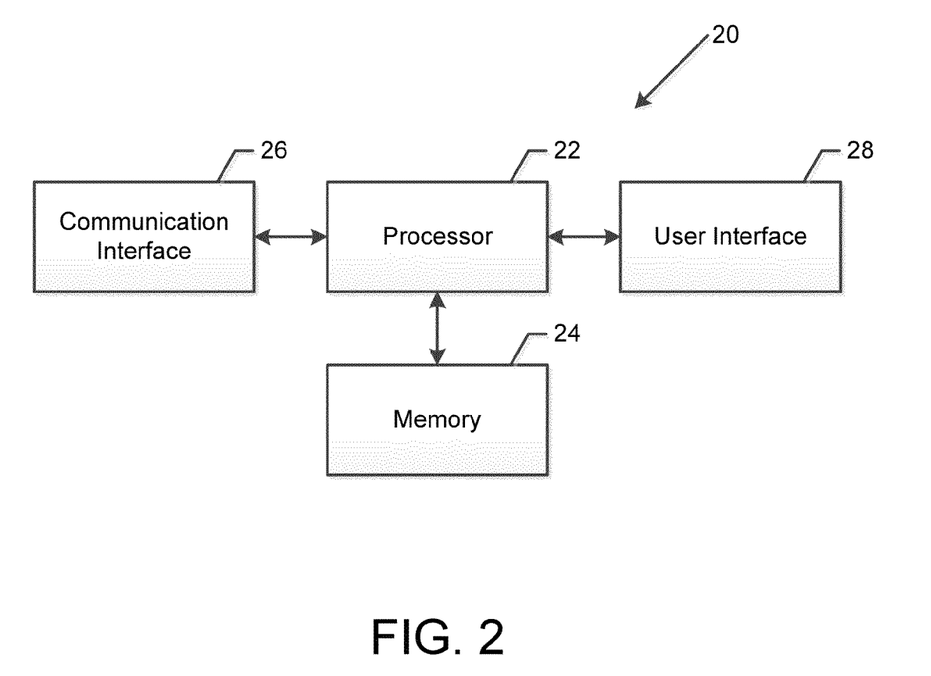
FIG. 2 is a block diagram of an apparatus that may be embodied by a communications device and that may be specifically configured in accordance with an example embodiment of the present invention.

The communication devices 10 may each include or otherwise be associated with an apparatus 20 as shown, for example, in FIG. 2 in order to perform the respective functions described below. It should also be noted that while FIG. 2 illustrates one example of a configuration of an apparatus for establishing and maintaining communications by the combination of first and second radio technologies, numerous other configurations may also be used to implement embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

Referring now to FIG. 2, the apparatus 20 for establishing and maintaining communications by the combination of first and second radio technologies may include or otherwise be in communication with a processor 22, a memory device 24, a communication interface 26 and optionally a user interface 28 (such as in instances in which the apparatus is embodied by a mobile terminal or other computing device). In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a communications device, such as a mobile terminal or a fixed computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to a communications device 10 in communication with the apparatus 20, such as to facilitate communications between the communications devices as shown in FIG. 1. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 20 is embodied by a mobile terminal or a fixed computing device, the apparatus may include a user interface 28 that may, in turn, be in communication with the processor 22 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a speaker, or other input/output mechanisms. In one embodiment, the user interface includes the display upon which visual representation(s) of the audio characteristic(s) of the one or more audio files are presented. Alternatively or additionally, the processor may comprise user interface circuitry configured to control at least some functions of one or more user interface elements such as a display and, in some embodiments, a speaker, ringer, one or more microphones and/or the like. The processor and/or user interface circuitry comprising the processor may be configured to control one or more functions of one or more user interface elements through computer program instructions (e.g., software and/or firmware) stored on a memory accessible to the processor (e.g., memory device 24, and/or the like).

Figure 3:
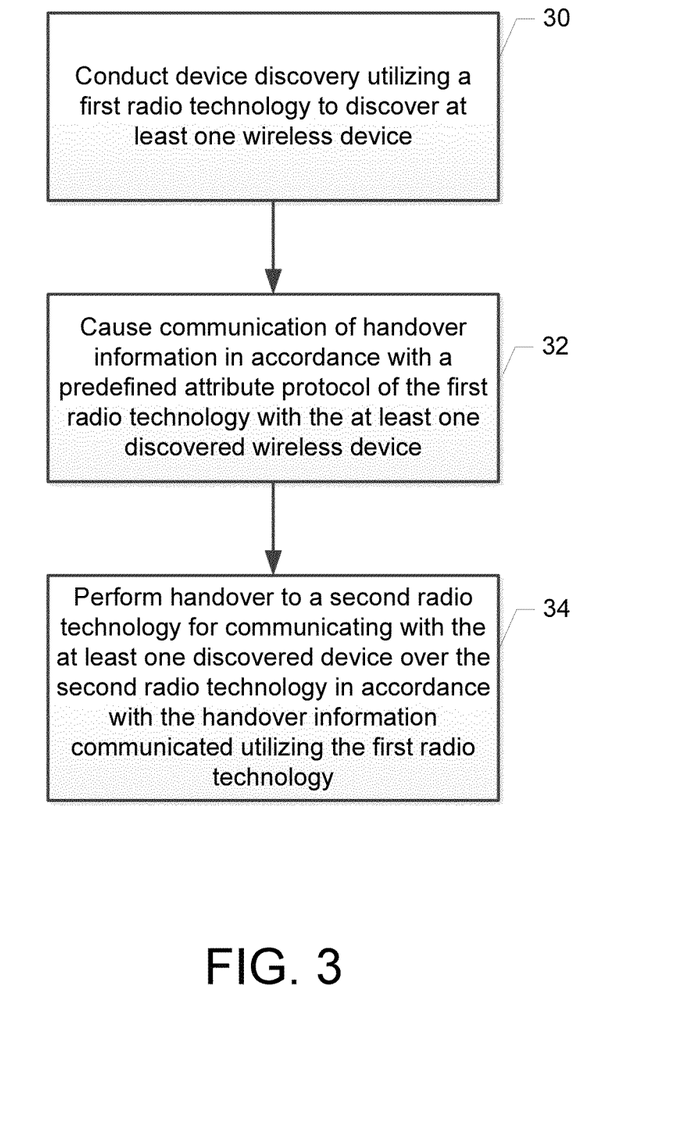
FIG. 3 is a flowchart illustrating the operations performed, such as by the apparatus of FIG. 2, in accordance with an example embodiment of the present invention.

In order to establish communication between a pair of proximately located communication devices 10, the operations performed, such as by the apparatus 20 of FIG. 2 embodied by a communications device, in accordance with an example embodiment are illustrated in FIG. 3. As set forth by block 30 of FIG. 3, the apparatus 20 may include means, such as the processor 22, the communication interface 26 or the like, for conducting device discovery utilizing a first radio technology to discover at least one wireless device. As described below, the first radio technology may have a smaller bandwidth than a second radio technology to which subsequent communications between the communication devices will be handed over. In one embodiment, the first radio technology may be Bluetooth LE technology.

As shown in block 32 of FIG. 3, the apparatus 20 may include means, such as the processor 22, the communication interface 26 or the like, for causing communication of handover information in accordance with a predefined attribute protocol of the first radio technology with the at least one discovered wireless device. The predefined attribute protocol of the first radio technology may include one or more attributes for facilitating handover to the second radio technology.

In one embodiment, the predefined attribute protocol is the generic attribute profile (GATT) that is built on top of the attribute protocol (ATT). GATT establishes common operations and the framework for data transmitted and stored by ATT. As described below, GATT defines roles for both a server and a client. The roles defined by GATT are not necessarily tied to specific generic access profile (GAP) roles, but may be specified by higher layer profiles. GATT and ATT are not transport specific and may be utilized in conjunction with both Bluetooth BR/EDR and Bluetooth LE technology.

The GATT server stores the data transmitted over the ATT and accepts ATT requests, commands and confirmations from the GATT client. The GATT server may send responses to requests and, when configured, may send indications and notifications asynchronously to the GATT client when specified events occur on the GATT server. GATT also specifies the format of the data stored by the GATT server.

Attributes, as transported by the ATT, are formatted as services and characteristics. Services may contain a collection of characteristics. Characteristics may contain a single value and one or more descriptors describing the characteristic value. As a result of the defined structure of services, characteristics and characteristic descriptors, a GATT client that is not specific to a profile may still traverse the GATT server and display characteristic values to a user. The characteristic descriptors may be utilized to provide descriptions of the characteristic values that may make the values more understandable to a user. In one embodiment, the attribute(s) of the predefined attribute protocol may include an attribute indicating a capability to handover to the second radio technology. In another embodiment, the attribute(s) of the predefined attribute protocol may include an attribute indicating a request to handover to the second radio technology.

Figure 4:
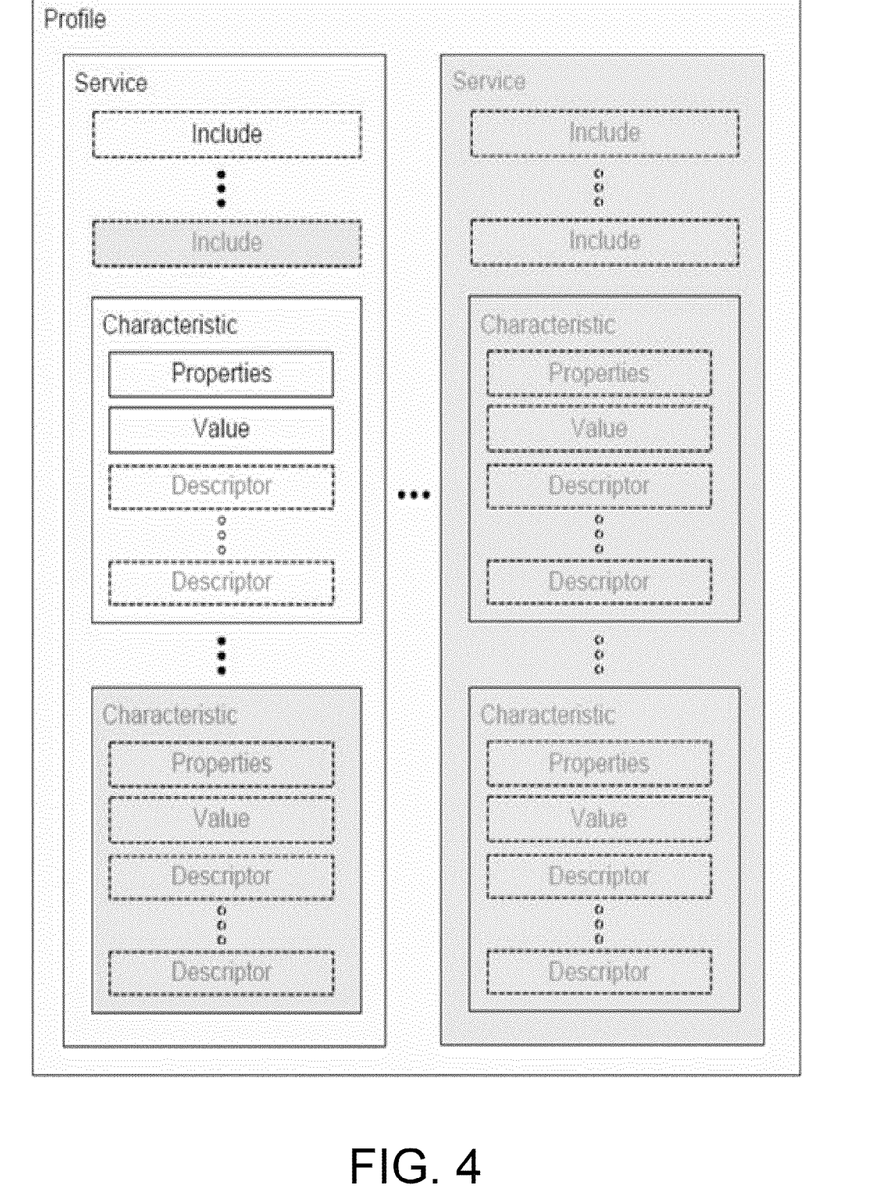
FIG. 4 is a representation of the profile hierarchy of a generic attribute profile (GATT) that may be utilized in order to facilitate handover from a first radio technology to a second radio technology in accordance with an example embodiment of the present invention.

A GATT profile specifies the structure in which the data is exchanged with the structure defining basic elements, such as services and characteristics, used in a profile. As shown in FIG. 4, the top level of the GATT profile hierarchy is a profile. A profile is composed of one or more services that are necessary to fulfill a use case. A service, in turn, is composed of characteristics or references to other services (designated as "include" in FIG. 4). In this regard, an included service is a method to reference another service definition existing on the server into the service being defined. To include another service, an include definition is provided within the service definition. By including another service, the entire definition of the included service is incorporated including all included services and characteristics of the included service. The included service still exists as an independent service and is not altered by having been included Each characteristic may contain a value and may contain optional information about the value, such as one or more descriptors and properties. The services and characteristics as well as the components of the characteristics, that is, the value and descriptors, comprise profile data and may be stored as attributes by the GATT server.

Figure 5:
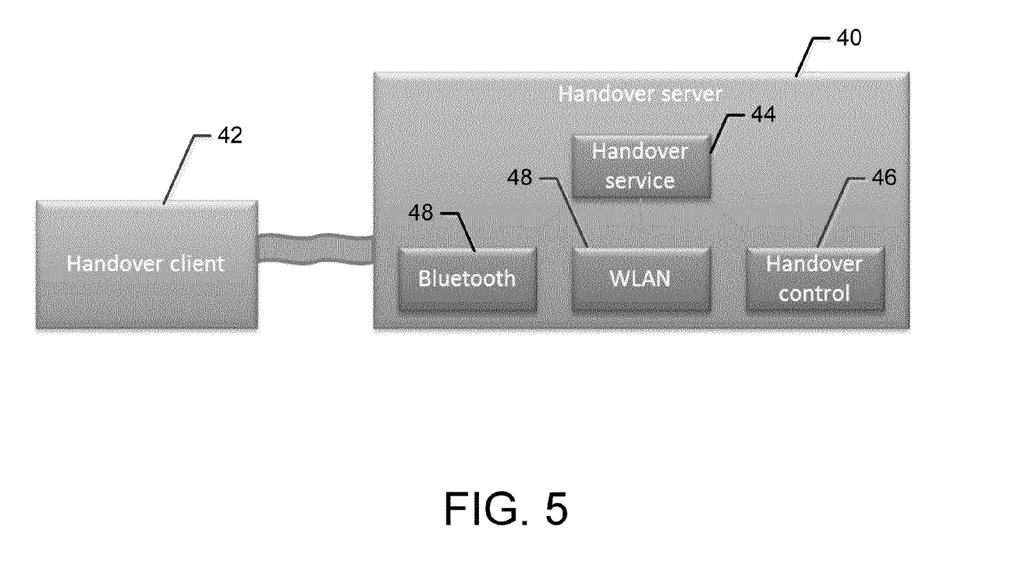
FIG. 5 is a block diagram illustrating a handover server and a handover client that may be configured to perform handover from a first radio technology to a second radio technology in accordance with an example embodiment of the present invention.

As noted above, GATT defines a server role and a client role. The communication devices 10 that are conducting the device discovery and will thereafter establish a communications link, such as shown in FIG. 1, may embody the GATT server and GATT client. For example, one of the communication devices may embody the GATT server and the other communication device may embody the GATT client. Alternatively, both devices may embody both the GATT server and the GATT client in order to provide flexibility with respect to the roles performed by the respective communication devices. As shown in FIG. 5, the communication device that embodies the GATT server 40 may be in communication with a GATT client 42 and may provide handover service 44 including handover control 46 and one or more technology related transport characteristics 48. In this regard, the GATT server of the illustrated embodiment includes transport characteristics for Bluetooth technology, e.g., Bluetooth BR/EDR technology, and WLAN technology. However, a GATT server may provide technology related transport characteristics for other radio technologies in other embodiments. Regardless of the type of radio technology, the transport characteristics may include transport related information, such as state and access credentials. As described below, the handover control provides for handover to be requested, permits notifications in the GATT profile to be read, enabled, disabled and received and permits handover conditions in the GATT profile to be read, written, enabled and disabled. Although the communication devices may embody the GATT server and the GATT client in various manners, the apparatus 20 and, more particularly, the processor 22 and/or the memory 24 of the apparatus embodied or otherwise associated with a communication device may embody the GATT server and/or the GATT client in one embodiment.

As indicated above, the apparatus 20 embodied by a communication device 10, such as the processor 22, the communication interface 24 or the like, may cause handover information to be communicated in accordance with a predefined attribute protocol, such as GATT. In an example embodiment, the handover information may be the address of the communication device that provides the GATT services, that is, the GATT handover service, such as by providing the address, e.g., BT_ADDR, of the communication device that embodies the GATT server.

In one embodiment, the apparatus 20 embodied by a first communication device 10, such as the processor 22, the communication interface 24 or the like, may cause a handover request to be provided. Among other things, the handover request may identify the second radio technology to which a handover is sought. In an embodiment in which the handover information is communicated in accordance with GATT, a handover service may be defined by GATT as follows:

| Service name: | Handover service | read |
|---|---|---|
| Characteristics BD_ADDR: | BD_ADDR | read |
| Characteristics handover request: | handover_req | read/write |
| Characteristics handover requester BD_ADDR: | BD_ADDR_req | write |

In order to request a handover in accordance with the foregoing GATT handover service, the first communication device may write a predefined value, such as 1, to the handover request characteristic of the GATT handover service. The first communication device may also provide its address to be utilized in conjunction with the second radio technology, such as BD_ADDR_req. Following the request for a handover as indicated by writing a predefined value to the handover request characteristic of the GATT handover service, the handover to the second radio technology may be performed. In this regard, block 34 of FIG. 3 illustrates that the apparatus 20 may include means, such as the processor 22, the communication interface 26 or the like, for performing handover to a second radio technology for communicating with the at least one discovered wireless device over the second radio technology in accordance with the handover information communicated utilizing the first radio technology. In the foregoing example, a handover may be facilitated to a second radio technology having a greater bandwidth than the first radio technology, such as from Bluetooth LE technology to Bluetooth technology, such as Bluetooth BR/EDR technology. However, the handover may be made for other purposes. For example, in embodiments in which the first radio technology is Bluetooth LE technology, a handover may be made to allow the execution of applications that might not otherwise be supported by Bluetooth LE technology, such as those requiring internet protocol (IP) or those that require Bluetooth BR/EDR profiles. As another example, a handover may be made from Bluetooth LE technology to Bluetooth BR/EDR to enjoy the low latency requirements of Bluetooth BR/EDR. In one embodiment, the handover may occur soon, such as immediately following the initial device discovery that was conducted with the first radio technology so as to take advantage of the second radio technology including, for example, the high bandwidth communication offered by the second bandwidth technology, for subsequent communications. For example, Bluetooth Low Energy technology is very useful for low power communication and especially for low power device discovery, but handover from Bluetooth Low Energy technology to other radio technologies is not defined by the Bluetooth Low Energy specification. However, by conducting the handover in one embodiment in accordance with the handover information conveyed via the predefined attribute protocol, a handover from the Bluetooth Low Energy technology to a second radio technology may be accomplished so as to provide for subsequent high bandwidth communication via the second radio technology.

Although the handover may be performed in various manners, the handover of one embodiment may include the apparatus 20 embodied by the first communication device 10 that is requesting the handover entering page mode. As such, the apparatus may include means, such as the processor 22, the communication interface 26 or the like, for causing page signals to be transmitted based upon the handover information. The apparatus, such as the processor, the communication interface or the like, embodied by the other communication device, that is, the second communication device, may determine that the first communication device has requested a handover, such as based upon having written a predefined value to the handover request characteristic, and may then enter page scan mode so as to detect the page signal. Thereafter, the communication devices may undergo a predefined connection setup process with respect to the second radio technology. In one embodiment, the parameters that define the page scan mode may be configured to facilitate a fast connection, such as by supporting continuous scanning. Although the examples of the handover provided herein move all communications from the first radio technology to the second radio technology, a handover may be conducted in accordance with other example embodiments of the present invention that moves some of the communications to the second radio technology, while still maintaining some communications with the first radio technology. For example, Bluetooth LE communication may be maintained following handover to a second radio technology, such as WLAN or Wi-Fi, such that Bluetooth LE communication may be resumed following termination of the communication via the second radio technology, such as following completion of a file transfer process to be conducted via the second radio technology.

Figure 6:
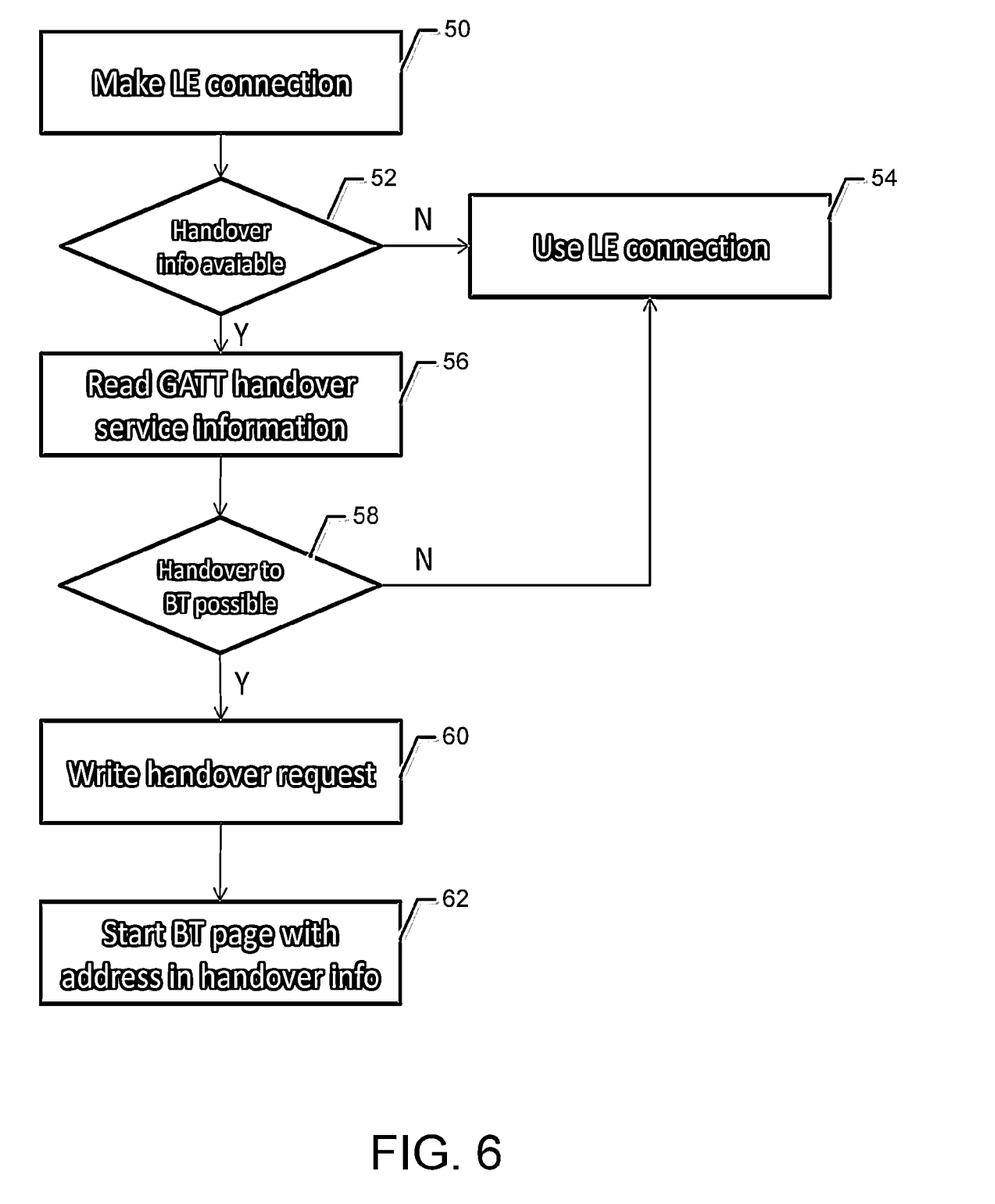
FIG. 6 is a flowchart illustrating the operations performed, such as by the apparatus of FIG. 2, in accordance with an example embodiment of the present invention.

By way of further example, reference now made to FIG. 6 which illustrates the operations performed in accordance with one embodiment of the present invention in which the first radio technology is Bluetooth LE technology, the second radio technology is Bluetooth technology, e.g., Bluetooth BR/EDR technology, and the predefined attribute protocol is a GATT protocol. While Bluetooth BR/EDR technology serves as the second radio technology in this example, the method, apparatus and computer program product of an example embodiment may be employed in conjunction with other types of second radio technologies including, for example, WLAN, Wi-Fi, etc. In this embodiment, device discovery may be conducted in order to establish a Bluetooth LE connection. See block 50. A communication device 10 may then determine if handover information is available, such as by determining if the Bluetooth device address BD_ADDR that indicates the address at which the GATT service is provided is available. See block 52. If not, the communication devices may continue to communicate via Bluetooth LE technology. See block 54. However, if handover information is available, the communication device may read the information related to the GATT handover service and may determine whether a handover to Bluetooth technology is possible, such as by determining that the communication device also supports Bluetooth technology and/or by determining whether a handover to Bluetooth communications is permitted or is denied, such as in an instance in which Bluetooth handover information is not provided by the handover service and, instead, some other second radio technology, e.g., WLAN, Wi-Fi, etc., is supported. See blocks 56 and 58. If not, the communication devices may continue to utilize the Bluetooth LE technology for subsequent communication. See block 54. However, if handover to Bluetooth is possible, the communication device may write the handover request, such as by setting the handover request characteristic of the GATT handover service to a predefined value, such as 1. See block 60. The communication device may then begin the handover process by, for example, causing page signals to be provided, as shown in block 62. The address of the communication device, such as BD_ADDR_req may be included with the page signals.

In an instance in which the GATT handover service supports handover to a plurality of different second radio technologies, the handover service may include a plurality of handover services, one of which is associated with each second radio technology. By way of example, the GATT services associated with handover to Bluetooth technology and handover to WLAN technology are shown below:

| Service name: | BT Handover service | read |
|---|---|---|
| Characteristics BD_ADDR: | BD_ADDR | read |
| Characteristics handover request: | BT_handover_req | read/write |
| Characteristics handover requester BD_ADDR: | BD_ADDR_req | write |
| Service name: | WLAN Handover service | read |
| Characteristics WLAN AP name: | WLAN SSID | read |
| Characteristics WLAN AP MAC: | AP MAC | read |
| Characteristics handover request: | WLAN_handover_req | read/write |

As will be noted, the handover request characteristic may indicate, in this embodiment, the second radio technology, e.g., Bluetooth (BT) or WLAN, that is requested for the handover.

In one embodiment in which a first communication device is making a Bluetooth LE connection to a second communication device, the second communication device may request the handover. In this embodiment, the apparatus 20 embodied by the second communication device, such as the processor 22, the communication interface 26 or the like, may populate the GATT profile to request the handover and to provide one or more parameters for the handover. For example, the apparatus embodied by the second communication device, such as the processor, the communication interface or the like, may cause the handover request characteristic to be set to a predefined value, such as 1, to indicate that a handover is being requested and may write its address to be utilized in conjunction with the second radio technology, e.g., BD_ADDR_req. The first communication device may, in turn, read the GATT profile and may detect that the handover request characteristic has been set to a predefined value requesting a handover. Thereafter, the apparatus embodied by the second communication device, such as the processor, the communication interface or the like, may cause page signals to be provided and the first communication device may enter a page scan mode following detection of the handover request in order to detect the page signals. The first and second communication devices may thereafter complete the handover to the second radio technology.

Figure 7:
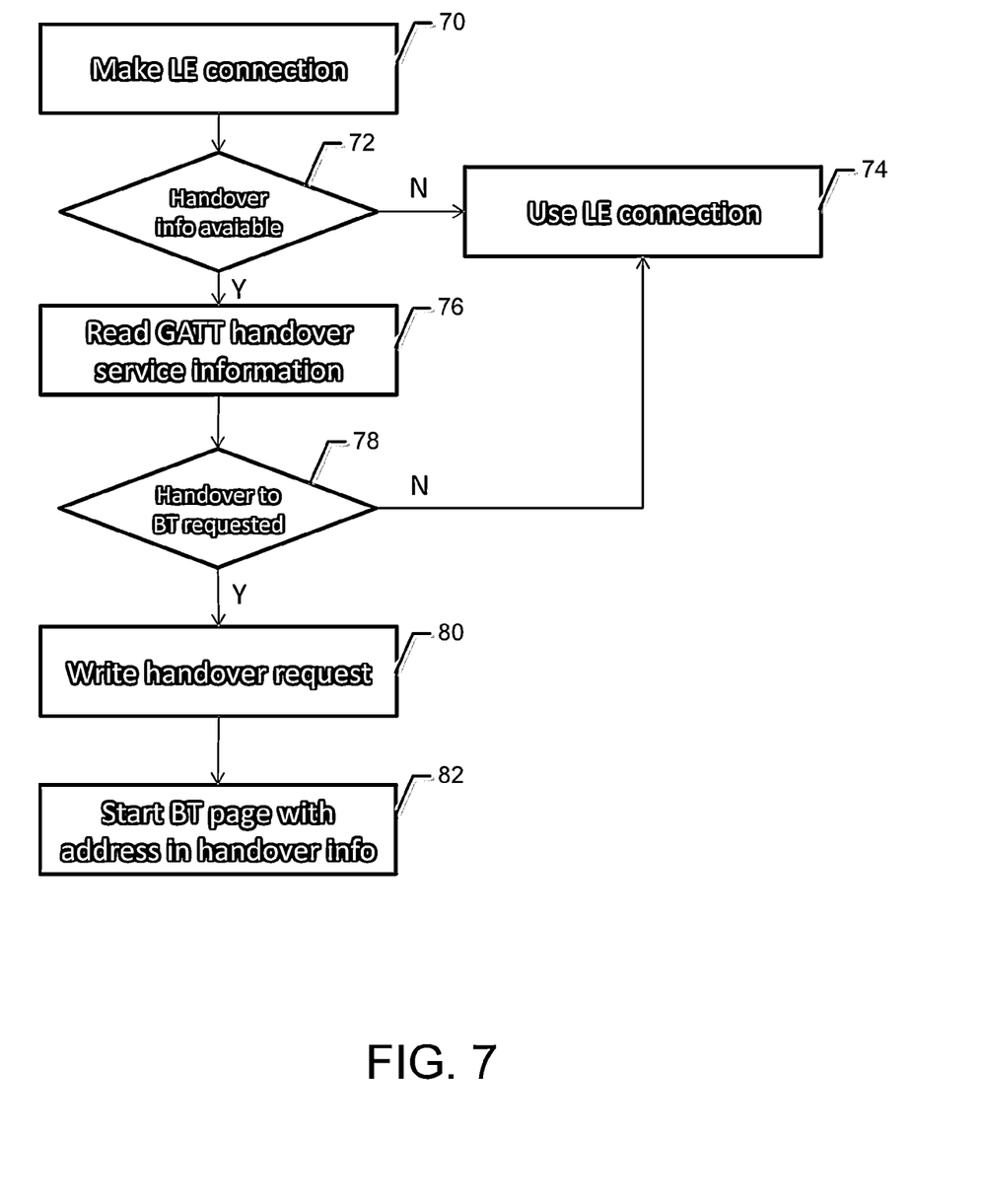
FIG. 7 is a flowchart illustrating the operations performed, such as by the apparatus of FIG. 2, in accordance with another example embodiment of the present invention.

By way of further explanation, reference is made to FIG. 7 which depicts the operations performed by the apparatus 20 embodied by the second communication device to which the Bluetooth LE connection is made. In this regard, the device discovery may result in the establishment of a Bluetooth LE connection as described above and as shown in block 70. The second communication device may then determine if handover information is available, such as by determining if the Bluetooth device address BD_ADDR that indicates the address at which the GATT service is provided is available. See block 72. If not, the communication devices may continue to communicate via Bluetooth LE technology. See block 74. However, if handover information is available, the second communication device may read the information related to the GATT handover service and may determine whether it, that is, the second communications device, wishes to handover to the second radio technology. See blocks 76 and 78. If not, the communication devices may continue to utilize the Bluetooth LE technology for subsequent communication. See block 74. However, in an instance in which the second communication device is desirous of a handover to a second radio technology, such as Bluetooth BR/EDR technology, the apparatus embodied by the second communication device, such as the processor, the communication interface or the like, may write a handover request as shown in block 80, such as by setting the handover request characteristic to a predefined value, such as 1. The apparatus embodied by the second communication device, such as the processor, the communication interface or the like, may thereafter cause one or more page signals to be provided. See block 82. In this regard, the page signals of one embodiment may include the address of the second communication device to be utilized in conjunction with the second radio technology, such BD_ADDR_req. The first communication device may detect the page signals while operating in a page scan mode following detection of the handover request characteristic being set to a predefined value and the communication devices may then complete the handover to the second radio technology so as to support communication having a greater bandwidth going forward.

In order to support handover in conjunction with some embodiments, the GATT profile may define a service named handover request as set forth below in conjunction with a handover to WLAN technology by way of example:

| Service name: | Handover request | read |
|---|---|---|
| Characteristics handover info available | Handover info available | write |
| Characteristics handover service | WLAN Handover service | read |

In the handover request service, a characteristic may relate to the availability of handover information and another characteristic may relate to the handover service which, identifies the second radio technology to which a handover is requested. If the handover information availability characteristic has been set to a predefined value, such as 1, a communication device 10, such as the first communication device that reads the handover request service, will recognize that the other communication device would like to handover to the second radio technology identified by the handover service characteristic.

Although the foregoing embodiment has been described in regards to the second communication device to which a connection is being established setting the handover information availability characteristic to the predefined value to indicate an interest in a handover to the second radio technology, the first communications device may also or alternatively set the handover information availability characteristic to the predefined value and, in one embodiment, may utilize the handover request service and may set the handover information availability characteristic to the predefined value to indicate to the second communications device an interest in handing over to the second radio technology identified by the handover service characteristic. As the foregoing examples illustrate, the operations set forth in FIG. 3 may be performed by an apparatus 20 embodied by either or each communication device. In an embodiment in which both communication devices request a handover by setting the handover information availability characteristic to the predefined value, the request that is set by the communications device that is first connected may be utilized including the second radio technology identified by the communications device that is first connected. As noted above, the handover service characteristics may be utilized in order identify the second radio technology to which the handover should be conducted. However, if no particular second radio technology is identified, the handover service characteristic may be set to a predefined value, such as 0.

As described above, FIGS. 3, 6 and 7 illustrate flowcharts of an apparatus 20, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 24 of an apparatus employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. The computer program product may be embodied as an application that is configured to implement, for example, at least certain ones of the operations of the flowcharts of FIGS. 3, 6 and 7.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
conducting, at an apparatus utilizing at least one of a processor or a communication interface, device discovery utilizing a first radio technology to discover at least one wireless device;
causing communication, by the apparatus utilizing at least one of the processor or the communication interface, of handover information over the first radio technology in accordance with a generic attribute protocol of a Bluetooth communication protocol with the at least one discovered wireless device, wherein the generic attribute protocol of the Bluetooth communication protocol comprises one or more attributes for facilitating handover to the second radio technology including a handover request characteristic that is set to a predefined value to indicate a request to handover to the second radio technology and an address to be utilized in conjunction with the second radio technology; and
performing handover to a second radio technology for communicating with the at least one discovered wireless device over the second radio technology in accordance with the handover information communicated over the first radio technology in accordance with the generic attribute protocol of the Bluetooth communication protocol that specifies the handover.

2. A method according to claim 1 wherein the one or more attributes includes an attribute indicating a capability to handover to the second radio technology.

3. A method according to claim 1 wherein the generic attribute profile (GATT) is built on top of an attribute protocol (ATT) with the handover information including an address of a communication device that provides GATT services.

4. A method according to claim 1 wherein the first radio technology is Bluetooth Low Energy technology and the second radio technology is at least one of Bluetooth technology or wireless local area network (WLAN) technology.

5. A method according to claim 1 wherein performing handover to the second radio technology comprises at least one of causing page signals to be transmitted based upon the handover information that was communicated or receiving page signals based upon the handover information that was communicated.

6. An apparatus comprising:
at least one processor and at least one memory including computer program code, the at least one memory and the computer program code configured to, with the processor, cause the apparatus to at least:
conduct device discovery utilizing a first radio technology to discover at least one wireless device;
causing communication of handover information over the first radio technology in accordance with a generic attribute protocol of a Bluetooth communication protocol with the at least one discovered wireless device, wherein the generic attribute protocol of the Bluetooth communication protocol comprises one or more attributes for facilitating handover to the second radio technology including a handover request characteristic that is set to a predefined value to indicate a request to handover to the second radio technology and an address to be utilized in conjunction with the second radio technology; and
performing handover to a second radio technology for communicating with the at least one discovered wireless device over the second radio technology in accordance with the handover information communicated over the first radio technology in accordance with the generic attribute protocol of the Bluetooth communication protocol that specifies the handover.

7. An apparatus according to claim 6 wherein the one or more attributes includes an attribute indicating a capability to handover to the second radio technology.

8. An apparatus according to claim 6 wherein the generic attribute profile (GATT) is built on top of an attribute protocol (ATT) with the handover information including an address of a communication device that provides GATT services.

9. An apparatus according to claim 6 wherein the first radio technology is Bluetooth Low Energy technology and the second radio technology is at least one of Bluetooth technology or wireless local area network (WLAN) technology.

10. An apparatus according to claim 6 wherein the at least one memory and the computer program code are configured to, with the processor, cause the apparatus to perform handover to the second radio technology by at least one of causing page signals to be transmitted based upon the handover information that was communicated or receiving page signals based upon the handover information that was communicated.

11. A computer program product comprising at least one non-transitory computer-readable storage medium having computer-executable program code portions stored therein, the computer-executable program code portions comprising program code instructions for:
conducting device discovery utilizing a first radio technology to discover at least one wireless device;
causing communication of handover information over the first radio technology in accordance with a generic attribute protocol of a Bluetooth communication protocol with the at least one discovered wireless device, wherein the generic attribute protocol of the Bluetooth communication protocol comprises one or more attributes for facilitating handover to the second radio technology including a handover request characteristic that is set to a predefined value to indicate a request to handover to the second radio technology and an address to be utilized in conjunction with the second radio technology; and
performing handover to a second radio technology for communicating with the at least one discovered wireless device over the second radio technology in accordance with the handover information communicated over the first radio technology in accordance with the generic attribute protocol of the Bluetooth communication protocol that specifies the handover.

12. A computer program product according to claim 11 wherein the one or more attributes includes an attribute indicating a capability to handover to the second radio technology.

13. A computer program product according to claim 11 wherein the generic attribute profile (GATT) is built on top of an attribute protocol (ATT) with the handover information including an address of a communication device that provides GATT services.

14. A computer program product according to claim 11 wherein the first radio technology is Bluetooth Low Energy technology and the second radio technology is at least one of Bluetooth technology or wireless local area network (WLAN) technology.

15. A computer program product according to claim 11 wherein the program code instructions for performing handover to the second radio technology comprise program code instructions for at least one of causing page signals to be transmitted based upon the handover information that was communicated or receiving page signals based upon the handover information that was communicated.

* * * * *